United States Patent
Xie et al.

(10) Patent No.: US 10,473,752 B2
(45) Date of Patent: Nov. 12, 2019

(54) SYSTEM AND METHOD FOR DETECTING AERIAL VEHICLE POSITION AND VELOCITY VIA SOUND

(71) Applicant: SZ DJI TECHNOLOGY CO., LTD., Shenzhen (CN)

(72) Inventors: Jiebin Xie, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/490,939

(22) Filed: Apr. 19, 2017

(65) Prior Publication Data
US 2017/0219686 A1  Aug. 3, 2017

Related U.S. Application Data

(63) Continuation of application No. PCT/CN2015/072160, filed on Feb. 3, 2015.

(51) Int. Cl.
*G01S 5/28* (2006.01)
*G01S 11/14* (2006.01)
(Continued)

(52) U.S. Cl.
CPC ............... *G01S 5/28* (2013.01); *G01S 11/14* (2013.01); *H04R 1/04* (2013.01); *H04R 1/406* (2013.01); *H04R 3/005* (2013.01); *H04R 3/04* (2013.01)

(58) Field of Classification Search
CPC combination set(s) only.
See application file for complete search history.

(56) References Cited

U.S. PATENT DOCUMENTS

| 7,606,115 B1 | 10/2009 | Cline et al. |
| 8,059,489 B1 | 11/2011 | Lee |
| (Continued) | | |

FOREIGN PATENT DOCUMENTS

| CN | 87107996 A | 6/1988 |
| CN | 102016632 A | 4/2011 |
| (Continued) | | |

OTHER PUBLICATIONS

The World Intellectual Property Organization (WIPO) International Search Report and Written Opinion for PCT/CN2015/072160 dated Oct. 21, 2015 9 Pages.

(Continued)

*Primary Examiner* — Duc Nguyen
*Assistant Examiner* — Assad Mohammed
(74) *Attorney, Agent, or Firm* — Anova Law Group, PLLC

(57) ABSTRACT

A system for determining a signal source position and velocity, and methods for manufacturing and using same are provided. An exemplary method includes determining a signal source position and velocity by performing a direction analysis on a plurality of audio signals and performing an intensity analysis on the audio signals. Another exemplary method includes determining that a signal source is on a collision course with a moving platform and providing an instruction for altering the course of the moving platform to avoid a collision with the signal source. An exemplary system includes an acoustic sensing system, having a primary microphone array, a secondary microphone, and a processing device for determining a signal source position and velocity by performing a direction analysis on a plurality of audio signals and performing an intensity analysis on the audio signals.

20 Claims, 12 Drawing Sheets

(51) Int. Cl.
*H04R 1/04* (2006.01)
*H04R 1/40* (2006.01)
*H04R 3/00* (2006.01)
*H04R 3/04* (2006.01)

(56) References Cited

U.S. PATENT DOCUMENTS

| | | | |
|---|---|---|---|
| 9,571,925 B1* | 2/2017 | Adva Fish | H04R 1/406 |
| 2001/0007969 A1* | 7/2001 | Mizushima | G01S 3/8086 |
| | | | 702/76 |
| 2003/0006887 A1 | 1/2003 | Rossini | |
| 2005/0271221 A1 | 12/2005 | Cerwin | |
| 2008/0150755 A1* | 6/2008 | Van Zandt | G08G 1/0965 |
| | | | 340/902 |
| 2010/0100269 A1 | 4/2010 | Ekhaguere et al. | |
| 2011/0018687 A1* | 1/2011 | Holm | G01S 1/72 |
| | | | 340/10.1 |
| 2011/0182436 A1* | 7/2011 | Murgia | H04R 3/005 |
| | | | 381/71.1 |
| 2013/0010980 A1* | 1/2013 | Yoshioka | G01S 3/802 |
| | | | 381/92 |
| 2013/0141576 A1* | 6/2013 | Lord | G08G 1/04 |
| | | | 348/148 |
| 2013/0216064 A1* | 8/2013 | Kim | H04R 3/00 |
| | | | 381/86 |
| 2013/0275873 A1* | 10/2013 | Shaw | G01S 3/8006 |
| | | | 715/716 |
| 2013/0328701 A1* | 12/2013 | Sato | G01S 3/808 |
| | | | 340/943 |
| 2013/0329863 A1* | 12/2013 | Bentley | H04M 3/40 |
| | | | 379/32.01 |
| 2014/0254807 A1* | 9/2014 | Fonseca, Jr. | H04R 29/00 |
| | | | 381/56 |
| 2014/0294183 A1* | 10/2014 | Lee | H04R 3/005 |
| | | | 381/56 |
| 2015/0195644 A1* | 7/2015 | Wilson | H04R 1/40 |
| | | | 381/92 |
| 2016/0066087 A1* | 3/2016 | Solbach | H04R 3/005 |
| | | | 381/71.1 |
| 2016/0163168 A1* | 6/2016 | Brav | G08B 13/1672 |
| | | | 381/56 |

FOREIGN PATENT DOCUMENTS

| | | |
|---|---|---|
| CN | 102682765 A | 9/2012 |
| CN | 102830243 A | 12/2012 |
| CN | 103069297 A | 4/2013 |
| CN | 103155032 A | 6/2013 |
| CN | 104155644 A | 11/2014 |
| EP | 0594119 A1 | 4/1994 |
| JP | H05142335 A | 6/1993 |
| JP | H0792264 A | 4/1995 |
| JP | H0102748 A | 1/1998 |
| JP | 2010095246 A | 4/2010 |
| JP | 2014025786 A | 2/2014 |
| TW | 201142829 A | 12/2011 |
| WO | 2016029469 A1 | 3/2016 |

OTHER PUBLICATIONS

Schmidt, Ralph O et al., Multiple Emitter Location and Signal Parameter Estimation, IEEE Transactions on Antennas and Propagation, Mar. 1986, pp. 276-280, vol. AP-34.

* cited by examiner

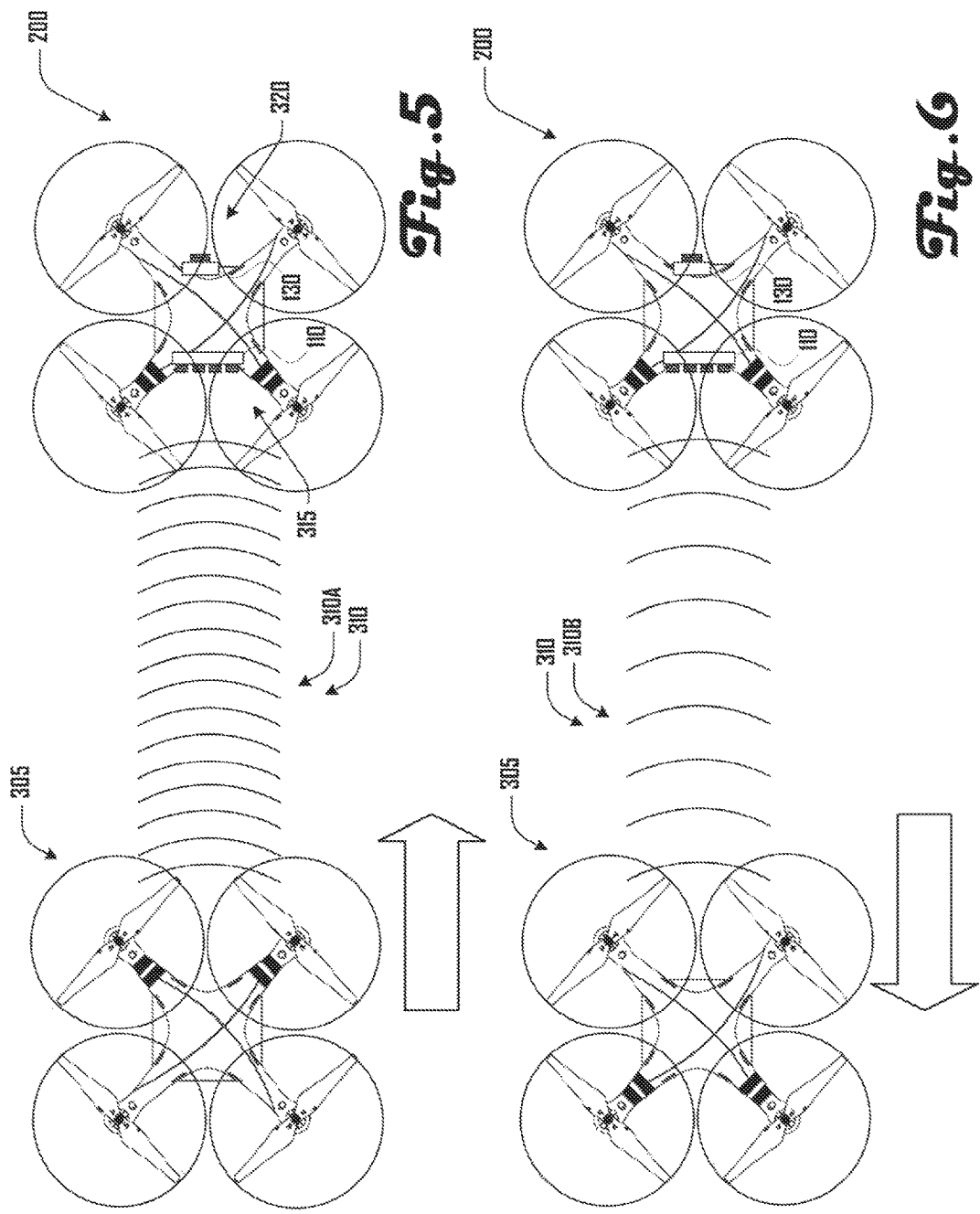

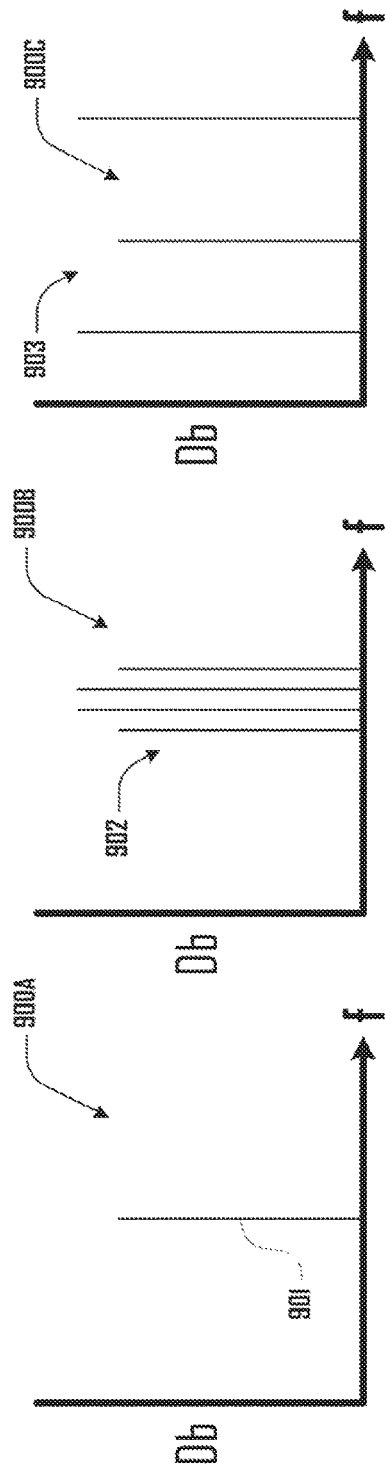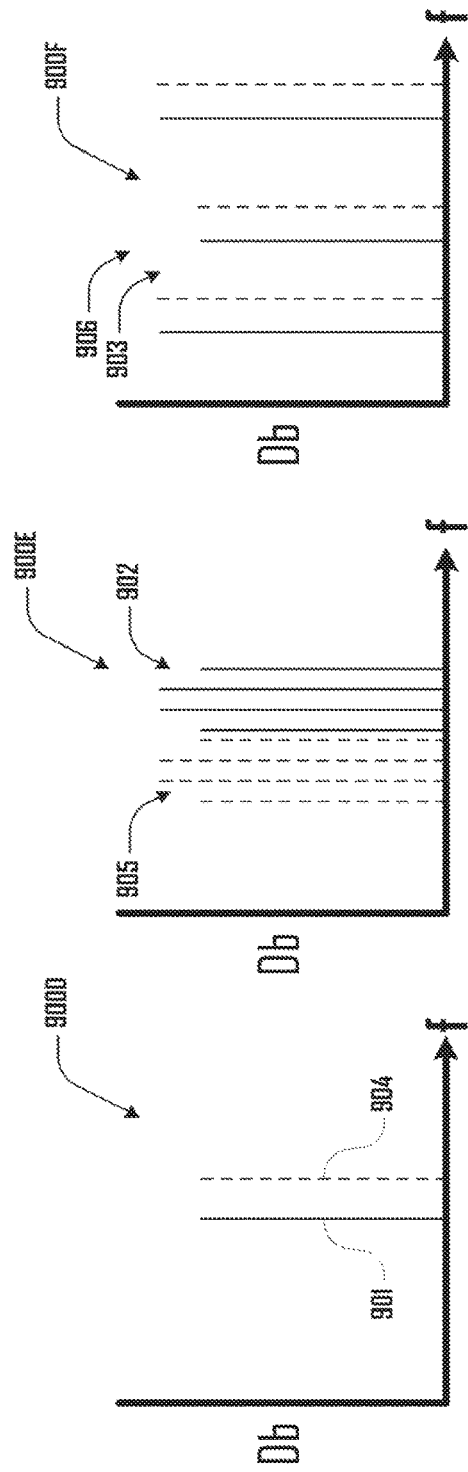

SYSTEM AND METHOD FOR DETECTING AERIAL VEHICLE POSITION AND VELOCITY VIA SOUND

CROSS-REFERENCE TO RELATED APPLICATION

This is a continuation application of International Application No. PCT/CN2015/072160, filed on Feb. 3, 2015, the entire contents of which are incorporated herein by reference.

FIELD

The present disclosure relates generally to object detection and more particularly, but not exclusively, to determining a signal source position and velocity.

BACKGROUND

With the development of unmanned aerial vehicles, aerial safety issues have received more attention. In a sky domain, there are often many aircraft, including airplanes and unmanned aerial vehicles. In many situations, these aircraft cannot communicate with each other directly, and, thus, it is difficult for a selected aircraft to know the velocity and position of other aircraft in the area. Conventional solutions include use territorial radar to detect the position and velocity of aircraft or relying on the vision of aircraft operators to avoid other aircraft. However, these approaches are not easily applicable to small unmanned aerial vehicles that are not easily observable by radar and that cannot rely on the vision of human operators. Unfortunately, current solutions fail to adequately provide for aerial vehicles capable of self-determination and self-detection (i.e., autonomous determination and detection of other aircraft).

In view of the foregoing, a need exists for an improved aerial vehicle position and velocity detection system in an effort to overcome the aforementioned obstacles and deficiencies of conventional systems.

SUMMARY

One aspect includes a method of determining a signal source position and velocity that includes performing a direction analysis on a plurality of audio signals and performing an intensity analysis on the audio signals. In one embodiment, at least one of the performing the direction analysis and the performing the intensity analysis is based on a Doppler analysis. Another embodiment also includes obtaining a first set of audio signals from a primary microphone array. Another embodiment also includes obtaining a first noise audio signal from a secondary microphone. A further embodiment includes subtracting the noise audio signal from each audio signal in the first set. A still further embodiment includes generating a first set of processed audio signals based on the subtracting.

One embodiment includes conducting a frequency estimation on the first set of processed audio signals. Another embodiment includes determining a signal direction of a first signal source based on the first set of processed audio signals. A further embodiment includes generating a second set of processed audio signals based on the subtracting. A still further embodiment includes conducting a frequency estimation on the second set of processed audio signals. Yet another embodiment includes determining a signal direction of a first signal source based on the second set of processed audio signals.

One embodiment includes determining whether the signal source is approaching or moving away from a detection position. Another embodiment includes determining whether the signal source is approaching or moving away from a detection position comprises performing a Doppler analysis of the first and second set of processed audio signals. A further embodiment includes determining a signal source distance from the detection position. In a still further embodiment, determining a signal source distance from the detection position comprises a determination based on a received signal intensity. Yet another embodiment includes predicting a future signal source position and velocity based on the performing the Doppler analysis, based on the performing the direction analysis and based on the performing the intensity analysis of a plurality of audio signals.

Another aspect includes a method of dodging a signal source that includes determining that a signal source is on a collision course with a detection position of a moving platform based on a determined signal source position and velocity determined by an embodiment of the method described above and dodging the signal source by altering the course of the moving platform.

In one embodiment, the altering the course of the moving platform comprises moving in an opposite direction of from the determined signal source position. In another embodiment, the altering the course of the moving platform comprises moving in an orthogonal direction from the determined signal source position. In a further embodiment, the altering the course of the moving platform comprises moving around the determined signal source position. In a still further embodiment, the altering the course of the moving platform comprises ceasing movement and hovering in place. In one embodiment, the moving platform is an aerial vehicle. In another embodiment, the aerial vehicle is an unmanned aerial vehicle.

A further aspect includes a computer program product for determining a signal source position and velocity, the computer program product being encoded on one or more machine-readable storage media and comprising instruction for executing the embodiments described above. A still further aspect includes a computer program product for dodging a signal source, the computer program product being encoded on one or more machine-readable storage media and comprising instruction for executing the embodiments described above.

One aspect includes a computer program product, wherein the embodiments of determining a signal source position and velocity as described above are provided as a series of instructions stored on non-transitory storage medium. Another aspect includes a computer program product, wherein the embodiments of dodging a signal source as described above are provided as a series of instructions stored on non-transitory storage medium.

A further aspect includes a computer program product for determining optical-flow in physical space, the computer program product being encoded on non-transitory machine-readable storage media and including instruction for subtracting a noise audio signal from each of a plurality of audio signals of a first set of audio signals to generate a first set of processed audio signals, instruction for conducting a frequency estimation on the first set of processed audio signals, instruction for determining a signal direction of a first signal source based on the first set of processed audio signals, instruction for generating a second set of processed audio signals, instruction for conducting a frequency estimation on the second set of processed audio signals, instruction for determining a signal direction of a first signal source based on the second set of processed audio signals, instruction for determining a signal direction of a first signal source based on the second set of processed audio signals, instruction for determining whether the signal source is approaching or moving away from a detection position, instruction for determining whether the signal source is approaching or moving away from a detection position comprises performing a Doppler analysis of the first and second set of processed audio signals, and instruction for determining a signal source position and velocity based on the Doppler analysis, the direction analysis and the distance analysis.

A further aspect includes a computer program product for determining optical-flow in physical space, the computer program product being encoded on non-transitory machine-readable storage media and including instruction for conducting a frequency estimation on a first set of audio signals, instruction for determining a signal direction of a first signal source based on the first set of audio signals, instruction for conducting a frequency estimation on a second set of audio signals, instruction for determining a signal direction of a first signal source based on the second set of audio signals, instruction for determining a signal direction of a first signal source based on the second set of audio signals, instruction for determining whether the signal source is approaching or moving away from a detection position, instruction for determining whether the signal source is approaching or moving away from a detection position comprises performing a Doppler analysis of the first and second set of audio signals; and instruction for determining a signal source position and velocity based on the Doppler analysis, the direction analysis and the distance analysis.

One aspect includes a method of determining a signal source position and velocity that includes conducting a frequency estimation on a first set of audio signals, determining a first signal direction of a signal source based on the first set of audio signals, conducting a frequency estimation on a second set of audio signals, determining a second signal direction of the signal source based on the second set of audio signals, determining whether the signal source is approaching or moving away from a detection position by performing a Doppler analysis of the first and second set of audio signals, determining a signal source distance from the detection position based on signal intensity of the first and second set of audio signals, and determining a signal source position and velocity based on the Doppler analysis, the direction analysis and the intensity analysis. One embodiment also includes predicting a future signal source position and velocity based on the Doppler analysis, the direction analysis and the intensity analysis.

Another aspect includes a method of dodging a signal source that includes determining that a signal source is on a collision course with a detection position on a moving platform based on a determined signal source position and velocity determined by the method of determining a signal source position and velocity according to the aspect above; and dodging the signal source by altering the course of the moving platform. In one embodiment, the moving platform is an aerial vehicle. In another embodiment, the aerial vehicle is an unmanned aerial vehicle.

A further aspect includes a system for determining a signal source position and velocity, wherein the system implements an embodiment described above. Yet another aspect includes a system for dodging a signal source, wherein the system implements embodiment described above.

One aspect includes a computer program product for determining a signal source position and velocity, the computer program product being encoded on one or more machine-readable storage media and comprising instruction for executing an embodiment described above. Another aspect includes a computer program product for dodging a signal source, the computer program product being encoded on one or more machine-readable storage media and comprising instruction for executing an embodiment described above.

A further aspect includes a computer program product, wherein the method of determining a signal source position and velocity as described in an embodiment above is provided as a series of instructions stored on non-transitory storage medium. A still further embodiment includes a computer program product, wherein the method of dodging a signal source of an embodiment described above is provided as a series of instructions stored on non-transitory storage medium.

One aspect includes an acoustic sensing system that includes a first primary microphone array; a secondary microphone; and a processing apparatus for determining a signal source position and velocity based on a Doppler analysis, a direction analysis and an intensity analysis of a plurality of audio signals.

Another aspect includes an acoustic sensing system that includes a housing, a first primary microphone array positioned on the housing and comprising a plurality of microphones, a first secondary microphone positioned on the housing, the first secondary microphone operably connected to the first primary microphone array, and a processing device for determining a signal source position and velocity based on a direction analysis and an intensity analysis of a plurality of audio signals.

In one embodiment, the determining a signal source position and velocity is further based on a Doppler analysis. In another embodiment, the first primary microphone array and first secondary microphone are positioned in parallel, but different, planes on the housing. In a further embodiment, the first primary microphone array points in a first direction and the first secondary microphone points in a second direction that is different than the first direction. In a still further embodiment, the first direction is opposite of the second direction. In yet another embodiment, the first direction is substantially perpendicular of the second direction.

In one embodiment, the microphones of the first primary microphone array are positioned on a substrate in a matrix configuration having rows and columns. In another embodiment, the microphones of the first primary microphone array are positioned in substantially the same plane.

One embodiment includes a processor and a memory positioned within the housing and operably connected to the first primary microphone array and the first secondary microphone. Another embodiment includes a second primary microphone array positioned on the housing and operably connected to the first primary microphone array and the first secondary microphone. A further embodiment includes a second secondary microphone positioned on the housing and operably connected to the first and second primary microphone array and the first secondary microphone.

In one embodiment, the first primary microphone array points in a first direction, the first secondary microphone points in a second direction, the second primary microphone array points in a third direction, the second secondary microphone points in a fourth direction; and at least two of the first, second, third and fourth directions are different directions. In another embodiment, the first direction is opposite of the second direction and the third direction is opposite of the fourth direction In one embodiment, the first primary microphone array and first secondary microphone are positioned in parallel, but different, planes on the housing; and the second primary microphone array and second secondary microphone are positioned in parallel, but different, planes on the housing that are substantially perpendicular to the first primary microphone array and first secondary microphone position. In another embodiment, the first primary microphone array and first secondary microphone are configured to detect ultrasonic sound. In a further embodiment, the first primary microphone array and first secondary microphone are configured to detect subsonic sound.

In one embodiment, the processing device is further configured to subtract a background noise audio signal obtained by the secondary microphone from each of a plurality of audio signals of the first set of audio signals to generate a first set of processed audio signals. In another embodiment, the processing device is further configured to conduct a frequency estimation on the first set of processed audio signals. In a further embodiment, the processing device is further configured to determine a signal direction of a signal source based on the first set of processed audio signals. In yet another embodiment, the processing device is further configured to generate a second set of processed audio signals.

In one embodiment, the processing device is further configured to conduct a frequency estimation on the second set of processed audio signals. In another embodiment, the processing device is further configured to determine a second signal direction of the signal source based on the second set of processed audio signals. In a further embodiment, the processing device is further configured to determine whether the signal source is approaching or moving away from a detection position. In a still further embodiment, the processing device is further configured to determine a signal source distance from the detection position. In yet another embodiment, the processing device is further configured to predicting a future signal source position and velocity based on the Doppler analysis, the direction analysis and the intensity analysis of a plurality of audio signals.

Another aspect includes a moving platform that includes a housing, a first primary microphone array positioned on the housing and comprising a plurality of microphones, a first secondary microphone positioned on the housing, the first secondary microphone operably connected to the first primary microphone array, and a processing device for determining a signal source position and velocity based on a direction analysis and an intensity analysis of a plurality of audio signals the acoustic sensing system. In one embodiment, the moving platform is an unmanned aerial vehicle.

BRIEF DESCRIPTION OF THE DRAWINGS

FIG. 5 is an exemplary detail drawing illustrating a higher signal frequency generated by the Doppler effect when a second mobile platform is moving toward the mobile platform of FIG. 4.

FIG. 6 is an exemplary detail drawing illustrating a lower signal frequency generated by the Doppler effect when a second mobile platform of FIG. 4 is moving toward the mobile platform of FIG. 4.

FIG. 12 is a set of three graphs that illustrate examples of aerial vehicle audio signatures.

FIG. 13 is a set of three graphs that illustrate examples of audio signals received by the system of FIG. 1 or 2, wherein the system determines that the signals correspond to the respective aerial vehicle audio signatures of FIG. 12.

Figure 1:
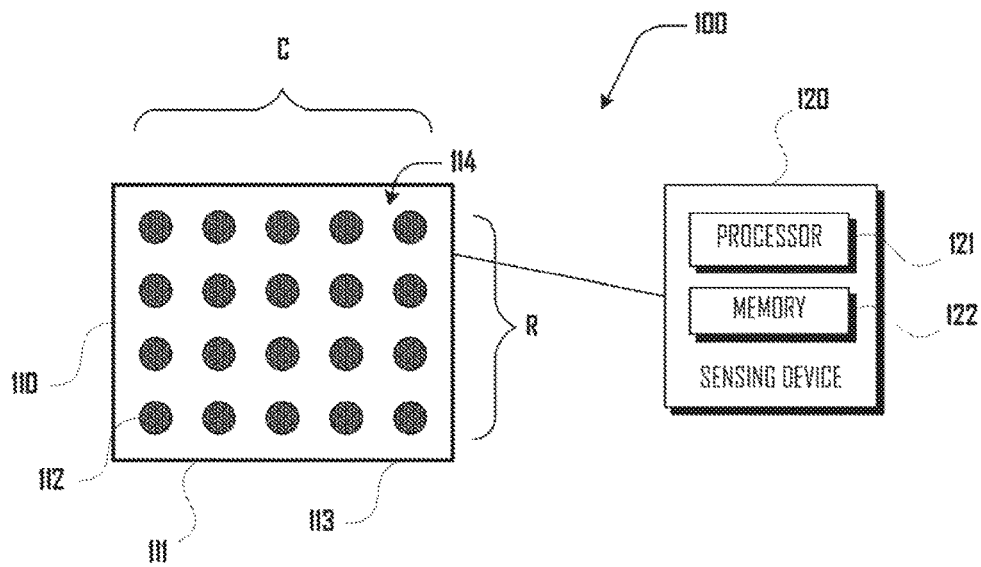
FIG. 1 is an exemplary network drawing illustrating an embodiment of a system for determining a signal source position and velocity.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION

Since currently-available aerial vehicle position and velocity detection systems are deficient, a system for determining a signal source position and velocity using sound can prove desirable and provide a basis for a wide range of applications, such as detection and avoidance of approaching aerial vehicles. This result can be achieved, according to one embodiment disclosed herein, by a signal source position and velocity detection system 100 as illustrated in FIG. 1.

Turning to FIG. 1, the aerial vehicle position and velocity detection system 100 is shown as comprising a primary microphone array 110 being operably connected to a sensing device 120 in accordance with one embodiment. As illustrated in FIG. 1, the sensing device 120 can include a processor 121 and/or a memory 122, which can be separate from (as shown in FIG. 1), or at least partially integrated with, the processor 121. In various embodiments, the primary microphone array 110 can include a plurality of microphones 112 configured to receive audio signals and positioned on a substrate 111 in a matrix configuration 114 defined by a plurality of rows R and columns C. Although shown as comprising twenty microphones 112 in the matrix configuration 114 for purposes of illustration only, the array 110 can include any suitable number of microphones 112 positioned in any suitable arrangement. For example, as depicted in FIG. 1, the microphones 112 in the array 110 can be positioned in substantially the same plane and/or evenly spaced in a matrix configuration 114.

Figure 2:
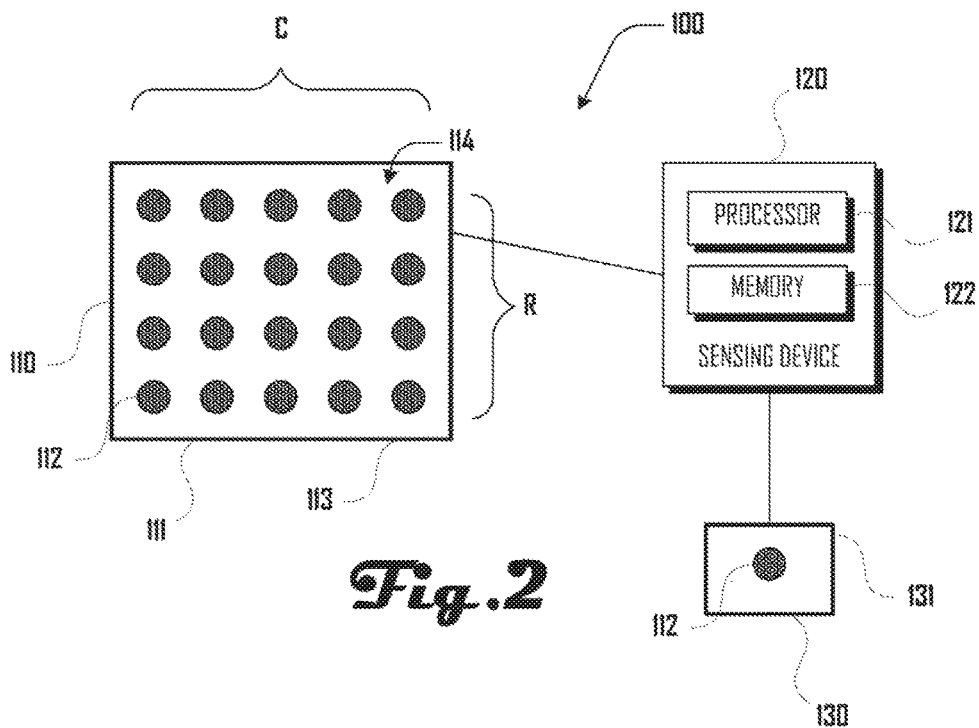
FIG. 2 is an exemplary network drawing illustrating an alternative embodiment of the system, wherein the system further comprises a secondary microphone.

Turning to FIG. 2, the aerial vehicle position and velocity detection system 100 is shown as comprising the primary microphone array 110 and a secondary microphone 130 each being operably connected to the sensing device 120 in accordance with another embodiment. The secondary microphone 130 can include a microphone 112 positioned on a substrate 131. As discussed herein, the secondary microphone 130 can be configured to receive audio noise signals, such as environmental sounds.

Although shown as comprising a single microphone 112 for purposes of illustration only, the secondary microphone 130 can include any suitable number of microphones 112 positioned in any suitable arrangement. The microphones 112 of the array 110 and the microphones 112 of the secondary microphone 130 can be the same and/or different type of microphone. Additionally, each microphone 112 can be operable to detect sound waves of any suitable frequency, including subsonic, sonic, and/or ultrasonic frequencies. Suitable types of microphones 112 can include a condenser microphone, a dynamic microphone, a ribbon microphone, a carbon microphone, a piezoelectric microphone, a fiber-optic microphone, a laser microphone, a liquid microphone, a MEMS microphone, or the like, without limitation. Each microphone 112 can have any suitable sensing pattern, including omnidirectional, bi-directional, sub-cardioid, cardioid, hyper cardioid, super cardioid, shotgun, or the like.

Figure 17:
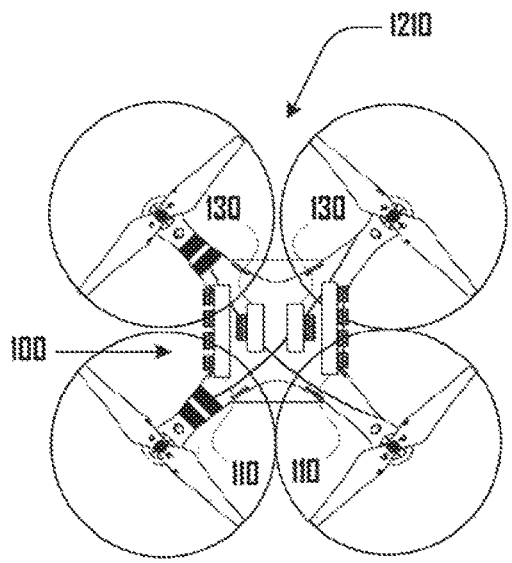
FIG. 17 is a detail drawing illustrating an alternative embodiment of the detection system of FIG. 2, wherein the system is positioned on a first aerial vehicle and includes first and second microphone arrays and first and second secondary microphones positioned on opposing sides of the aerial vehicle and pointing in opposite directions.
Figure 18:
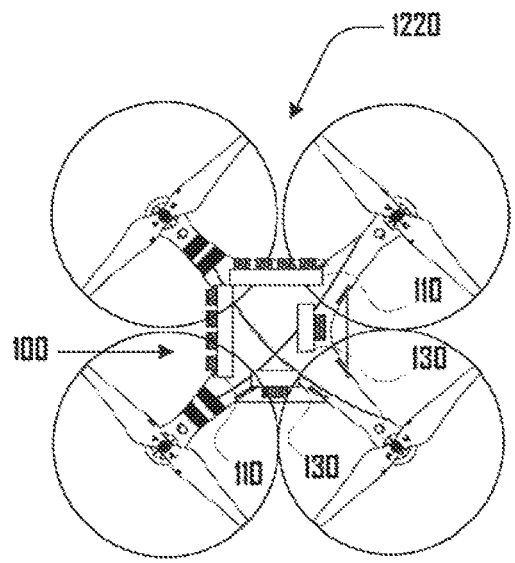
FIG. 18 is a detail drawing illustrating an alternative embodiment of the detection system of FIG. 17, the first and second microphone arrays and the first and second secondary microphones are positioned perpendicularly on the aerial vehicle and pointing outwardly.

Although shown in FIG. 2 as including one primary microphone array 110 and one secondary microphone 130 for purposes of illustration only, the position and velocity detection system 100 can include any suitable number of primary microphone arrays 110 and/or secondary microphones 130 (see, for example, FIGS. 17 and 18). The primary microphone array 110, in other words, can include one or more microphone arrays, and each microphone array of the primary microphone array 110 can be separate and/or at least partially integrated with another microphone array. Additionally and/or alternatively, the primary microphone array 110 or secondary microphone 130 can be absent. For example, in some embodiments, noise reduction using the secondary microphone 130 may not be performed, and therefore the secondary microphone 130 can be absent (see, for example, FIGS. 1, 19 and 20).

Figure 3:
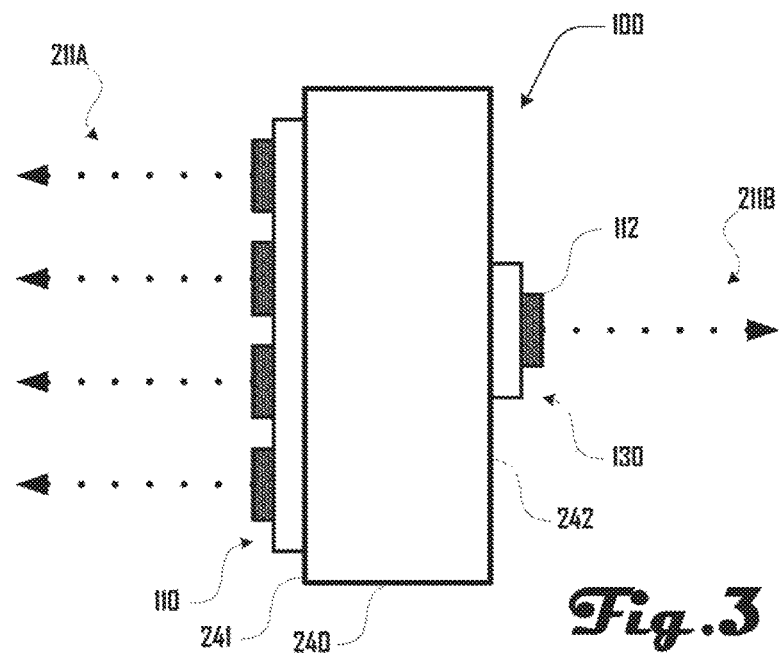
FIG. 3 is an exemplary side-view drawing illustrating an embodiment of the system for determining a signal source position and velocity of FIG. 2, wherein the system is positioned on a housing.

As illustrated in FIG. 3, the position and velocity detection system 100 can be positioned on a housing 240. For example, the primary microphone array 110 can be positioned on a first side 241 of the housing 240 pointing in a first direction 211A, and the secondary microphone 130 can be positioned on a second side 242 of the housing 240 pointing in a second direction 211B. The second direction 211B is opposite to the first direction 211A, in other words, the first direction 211A is substantially perpendicular to the second direction 211B.

Although FIG. 3 illustrates the primary microphone array 110 and secondary microphone 130 positioned in parallel planes on opposing sides of the housing 240 and pointing in opposite directions 211A, 111B, for purposes of illustration only, the primary array 110 and secondary microphone 130 can be positioned in any suitable relationship, including in perpendicular planes, or the like. In other words, an angle (not shown) formed between the first and second directions 111A, 111B can comprise any suitable angle including 180°, 90°, 45°, or the like, and/or any suitable range of angles. Additionally, some embodiments can include any suitable plurality of the array 110 and/or secondary microphone 130 in any suitable relationship.

The examples discussed herein relate to detection of position and velocity of a signal source, such as an Unmanned Aerial Vehicle (UAV) or other aerial vehicle, via sound using the system 100; however, further embodiments can relate to detection of position and velocity of other stationary and/or mobile objects including vehicles, people, animals, devices, or the like, and the disclosed examples and illustrative embodiments should not be construed to be limiting on the scope of the disclosed system 100.

Additionally, in some embodiments where the system 100 is positioned on an aerial vehicle, the system 100 can detect the sound signature of the aerial vehicle reflected off of an object and use this detection to avoid the object. For example, the system 100 may use echo-location techniques to avoid objects based on an echo of the sound from the aerial vehicle upon which the system 100 is positioned.

Figure 4:
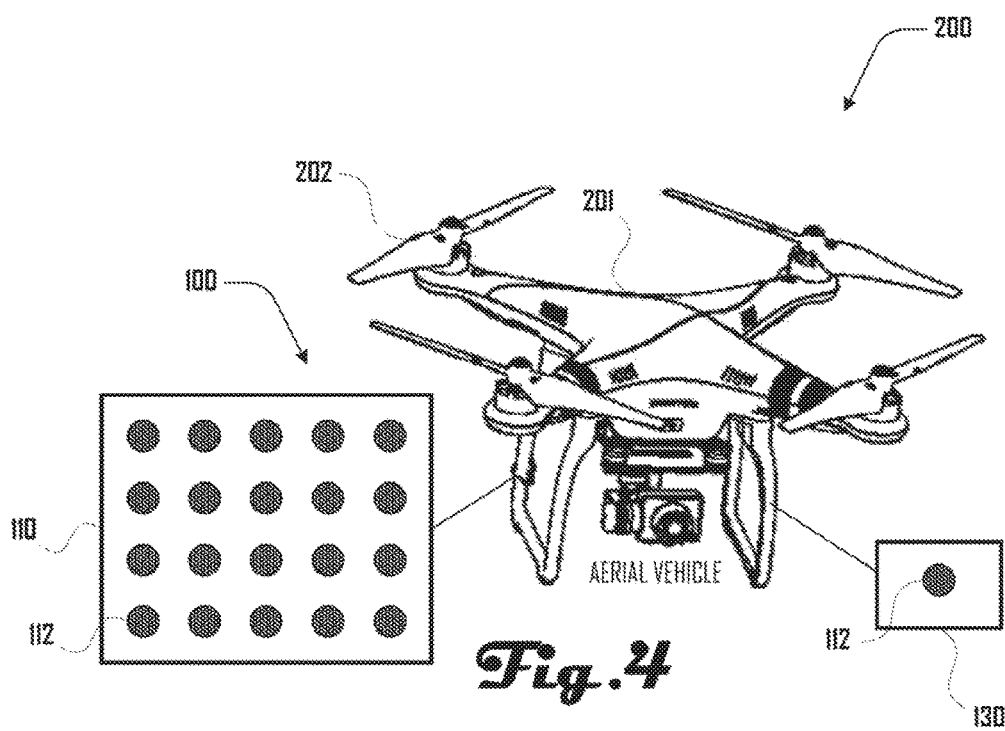
FIG. 4 is an exemplary network drawing illustrating an alternative embodiment of the system for determining a signal source position and velocity of FIG. 2, wherein the system is operably connected to a mobile platform.
Figure 16:
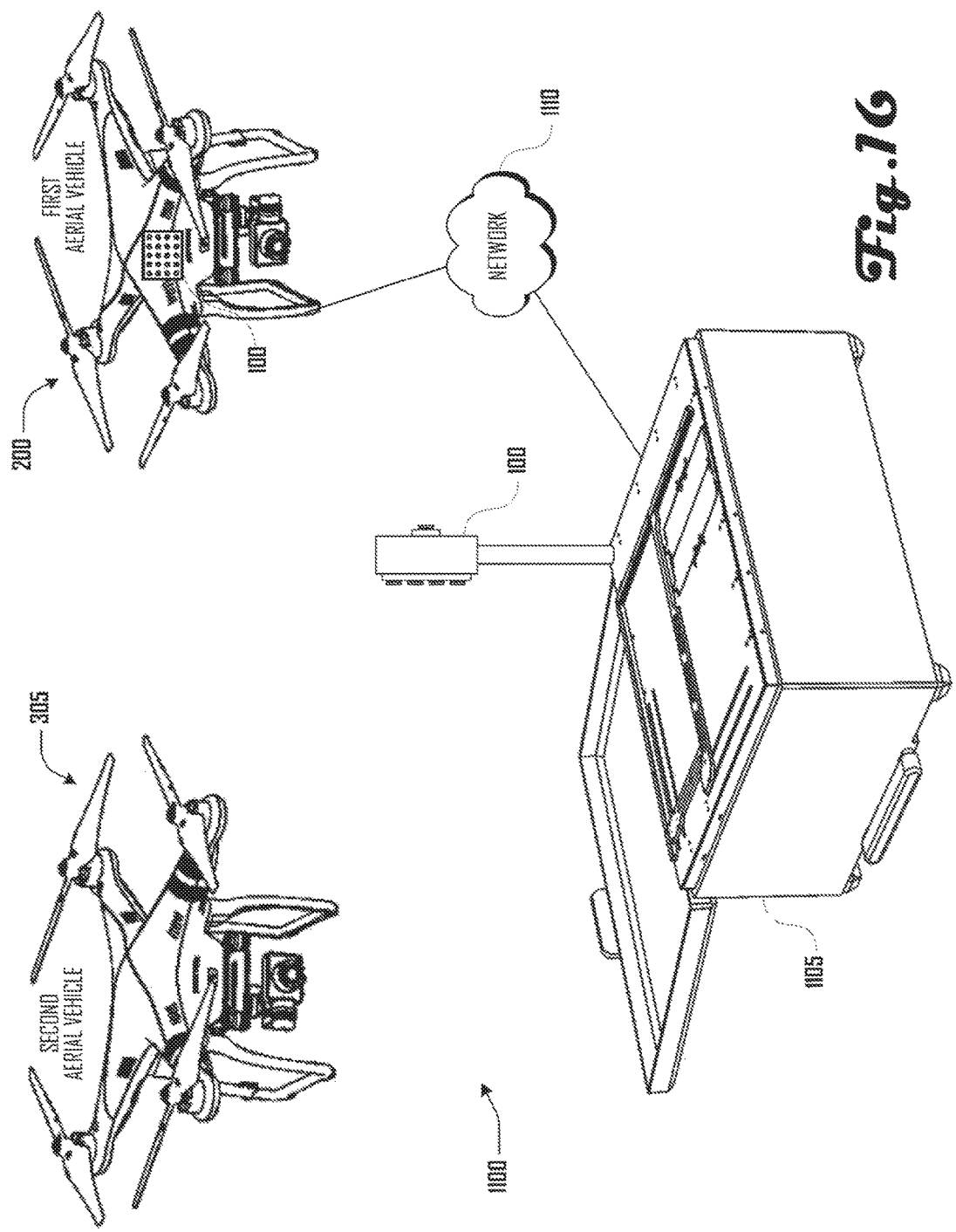
FIG. 16 an exemplary network diagram that illustrates a first aerial vehicle that is operably connected to a base station via a network.

Various embodiments can include a ground-based assembly 1105 (shown in FIG. 16) that is configured to detect the position and velocity of at least one second aerial vehicle 305 (shown in FIG. 16). In other embodiments, and as depicted in FIGS. 4-6, the system 100 can be operably connected to and/or positioned on the first aerial vehicle 200, including an Unmanned Aerial Vehicle (UAV). For example, as depicted in FIGS. 5 and 6, the array 110 can be positioned on a first side 315 of the first aerial vehicle 200 and the secondary microphone 130 can be positioned on a second side 320 of the first aerial vehicle 200.

As illustrated in FIG. 4, the first aerial vehicle 200 can include a housing 201 and a plurality of rotors 202 that are rotatably coupled to the housing 201. The rotors 202 spin to provide propulsion and rotation capabilities to the first aerial vehicle 200. The first aerial vehicle 200 can emit sound caused by rotation of the rotors 202 and/or a motor (not shown) that powers the rotors 202. This sound can be substantially constant while the first aerial vehicle 200 is operating and can be unique compared to environmental sounds. Being unique for different types of first and/or second aerial vehicles 200, 305 the sound emitted by the first and/or second aerial vehicles 200, 305 can provide a unique audio signature for the first aerial vehicle 200. Accordingly, this unique audio signature of the operating first and/or second aerial vehicles 200, 305 can be used to determine its position and velocity relative to the detection system 100 as discussed herein. Additionally, where the detection system 100 is part of the first aerial vehicle 200, detecting the position and velocity of other aerial vehicles 305 can provide for avoidance of these other aerial vehicles 305 as discussed herein.

Although the first aerial vehicle 200 is shown as being a quad-rotor UAV herein for purposes of illustration only, it should be clear that any suitable type of first aerial vehicle 200 can include the detection system 100. Additionally, while a first aerial vehicle 200 and/or mobile platform can include a UAV, the aerial vehicle and/or mobile platform can additionally and/or alternatively include an airplane, jet, helicopter, or the like.

Figure 7:
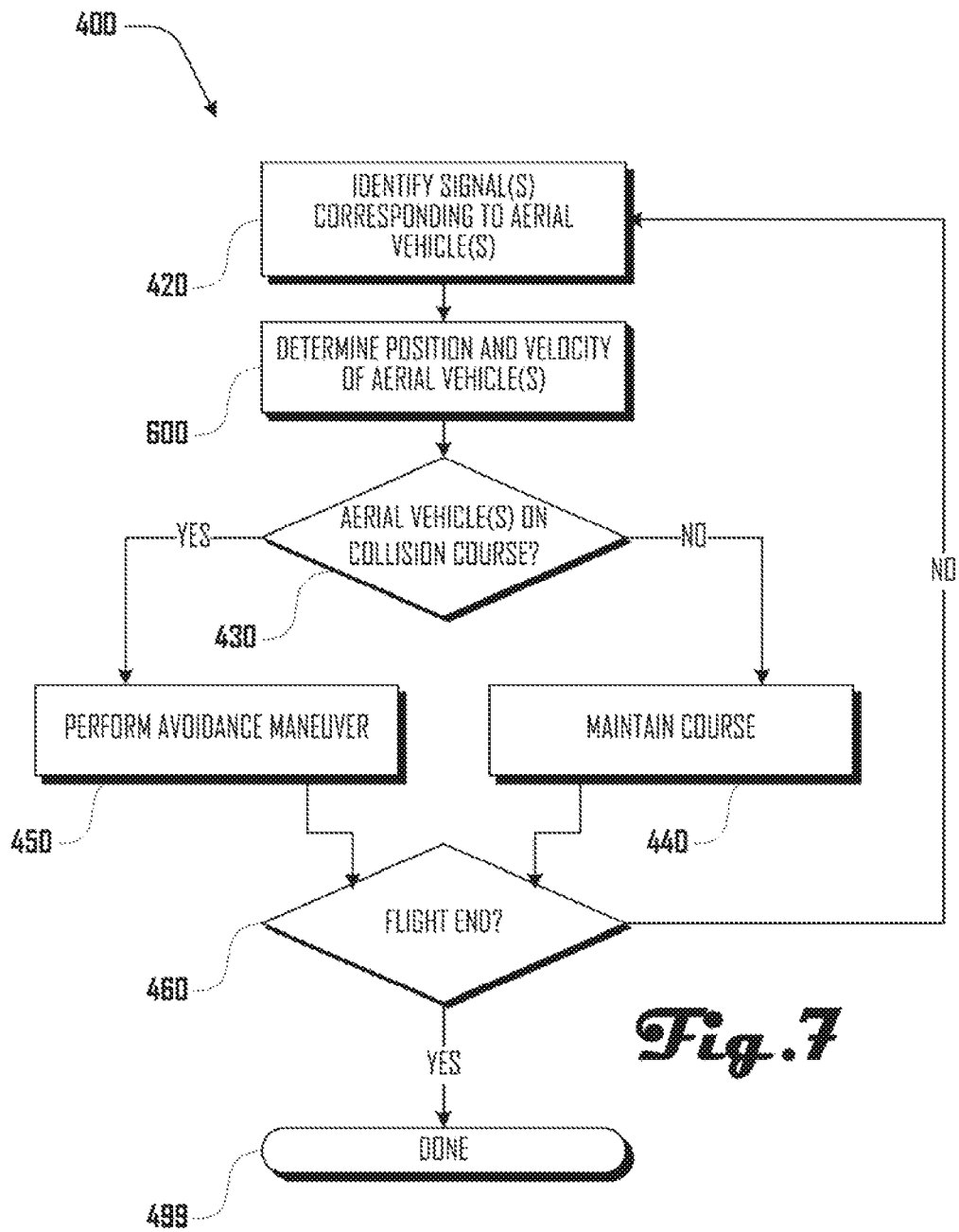
FIG. 7 is an exemplary flow diagram illustrating an embodiment of a method of aerial vehicle detection and avoidance.
Figure 8:
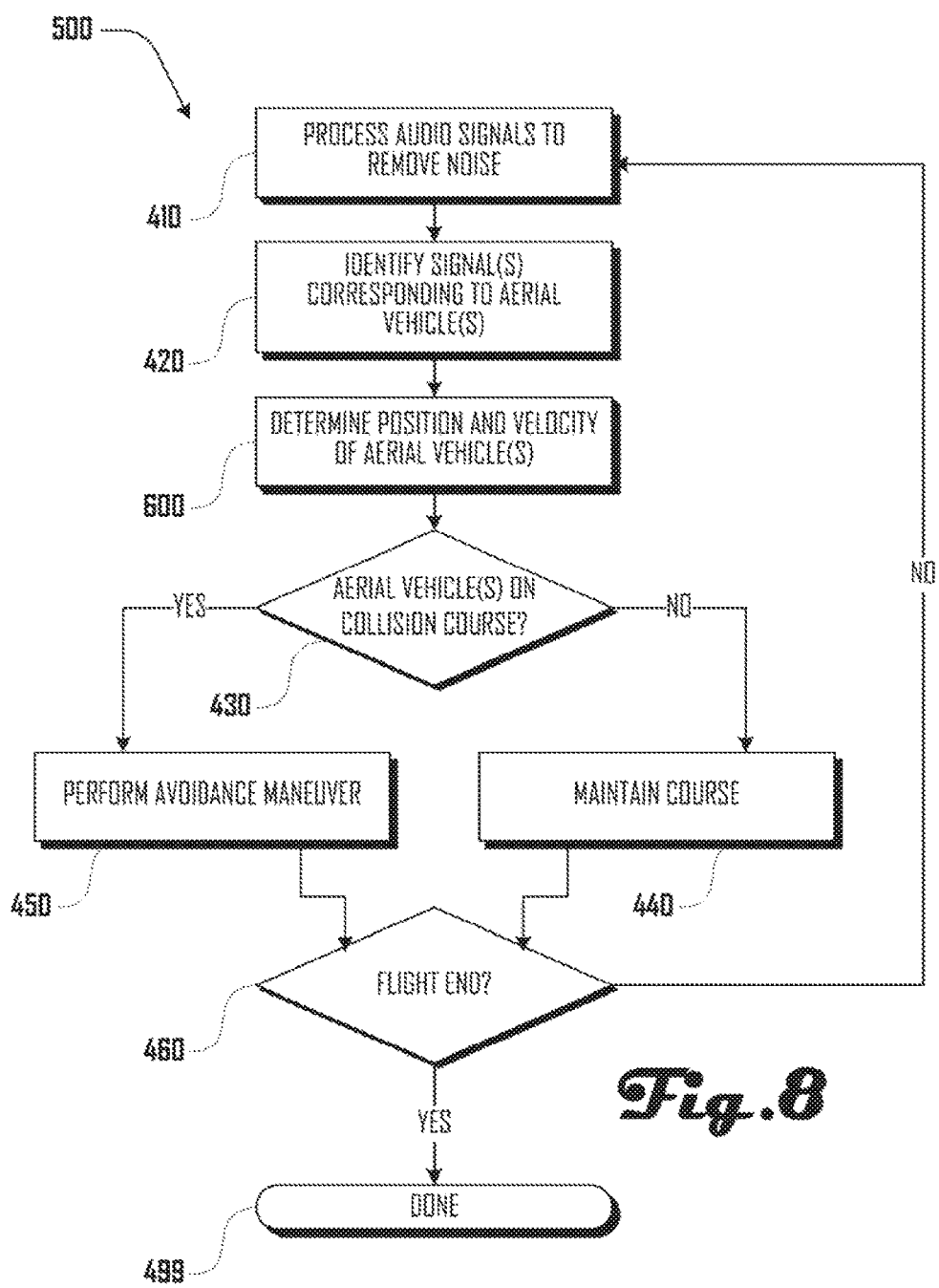
FIG. 8 is an exemplary flow diagram illustrating another embodiment of a method of aerial vehicle detection and avoidance.

FIGS. 7 and 8 are flow diagrams illustrating methods 400, 500 of aerial vehicle detection and avoidance in accordance with an embodiment. Referring to FIGS. 7 and 8, in block 420, at least one audio signal corresponding to at least one aerial vehicle is identified. Identifying one or more signal corresponding to one or more aerial vehicle can be done in any suitable manner. For example, as discussed above, the aerial vehicle can emit an audio signature that can be identified as being distinct from other ambient sounds. The audio signature can comprise a range of frequencies, a set of frequency peaks, a single frequency peak, and/or a pattern of one or more frequency peak or frequency range.

For example, FIG. 12 includes three graphs 900A, 900B, 900C of example audio signatures 901, 902, 903. The first graph 900A shows an audio signature 901 that consists of a single frequency peak. The second graph 900B shows an audio signature 902 that consists of a grouped range of frequency peaks. The third graph 900C shows an audio signature 903 that consists of three separate frequency peaks. In some embodiments, identifying a signal associated with a selected aerial vehicle can include identifying a signal that directly (and/or closely) matches a known audio signature 901, 902, 903 of the selected aerial vehicle.

However, as discussed herein the audio signature of the second aerial vehicle 305 (shown in FIGS. 5 and 6) can be perceived as being higher or lower depending on the Doppler effect. In other words, motion of the signal source and/or detection system 100 relative to the first aerial vehicle 200 can change perceived frequency of sound received by the detection system 100. Accordingly, in some embodiments, identifying the signal associated with the aerial vehicle can include identifying a signal that matches a given audio signature but that has been shifted either higher or lower in frequency. For example, FIG. 13 illustrates graphs 900D, 900E, 900F that show respective received signals 904, 905, 906 that can be matched to the audio signatures 901, 902, 903 shown in FIG. 12.

Graph 900D shows a received signal 904 (dashed line) that can be identified as corresponding to audio signature 901. In this example, the frequency of the received signal 904 is shifted upward in frequency compared to baseline frequency 901 because the second aerial vehicle 305 is approaching the system 100 (see, e.g., FIG. 5).

Graph 900E shows a received signal 905 (dashed lines) that can be identified as corresponding to audio signature 902. In this example, the frequency of the received signal 905 is shifted downward in frequency compared to baseline frequency 902 because the second aerial vehicle 305 is moving away from the system 100 (see, e.g., FIG. 6). In this example, correspondence between baseline frequency 902 and received signal 905 can be identified based on the number of signature peaks, similar intensity signature and/or the same shift distance of each of the signature peaks.

Graph 900F shows a received signal 906 (dashed lines) that can be identified as corresponding to audio signature 903. In this example, the frequency of the received signal 906 is shifted upward in frequency compared to baseline frequency 903 because the second aerial vehicle 305 is approaching the system 100 (see, e.g., FIG. 5). In this example, correspondence between baseline frequency 903 and received signal 906 can be also identified based on the number of signature peaks, similar intensity signature and/or the same shift distance of each of the signature peaks.

Although naturally occurring audio signatures of aerial vehicles can be identified (e.g., the audio signature of a motor and/or rotors), in some embodiments, aerial vehicles can include a speaker that broadcasts an audio signature and/or other unique identifying signal such as a serial number, or the like. Such an audio signature can be an audio signature as discussed above, including a pattern. For example, in one embodiment an audio signature can cycle between signatures 901, 902 and 903, with each having a duration of one second. In another example, the audio signature 903 can be broadcast on-and-off for one or more selected time periods to generate a pattern (e.g., like Morse code). Such an audio signature can be subsonic, sonic, and/or supersonic. In some embodiments, unique audio signatures can be provided for each given aerial vehicle (e.g., like a MAC address) so that each aerial vehicle can be identified based on its associated unique audio signature.

Returning to FIGS. 7 and 8, the methods 400, 500 continue to block 600, where the position and velocity of the second aerial vehicle 305 is identified. In decision block 430, a determination is made whether the second aerial vehicle 305 (shown in FIGS. 5 and 6) is on a collision course with the first aerial vehicle 200 (shown in FIGS. 5 and 6). For example, the velocity and position of the first aerial vehicle 200 can be compared to the determined velocity and position of the second aerial vehicle 305 to determine if a collision is possible.

If a determination is made that a collision course is not present, then the methods 400, 500 continues to block 440 where the current course is maintained. However, if a determination is made that a collision course is present, then the method 400 continues to block 450 where an avoidance maneuver is performed. Avoidance maneuvers can include any suitable course correction or movement that can prevent a collision, including moving in the opposite direction from an approaching second aerial vehicle 305; moving in an orthogonal direction from an approaching second aerial vehicle 305; moving around an approaching second aerial vehicle 305; or hovering in place to allow the approaching second aerial vehicle 305 to pass.

At decision block 460, a determination is made whether the second aerial vehicle 305 has ended its flight, and if so, the methods 400, 500 are done in block 499. However, if the flight of the second aerial vehicle 305 is not ended, then the method 400 cycles back to block 420 (shown in FIG. 7), or alternatively, the method 500 cycles back to block 410 (shown in FIG. 8) as discussed in more detail below.

Accordingly, the methods 400, 500 continue while the first aerial vehicle 200 is flying so that the first aerial vehicle 200 can continuously detect and avoid other aerial vehicles 305 that may be approaching or proximate.

In some embodiments, audio signals can be pro-processed to remove noise. For example, referring to FIG. 8, the method 500 begins, in block 410, where audio signals are processed to remove noise. In various embodiments, microphones 112 of the array 110 can each receive a respective audio signal, and a noise audio signal received from the secondary microphone 130 can be subtracted from the respective audio signals received by the microphones 112 of the array 110.

In various embodiments, the noise signal received from the secondary microphone 130 is assumed to substantially represent background noise and the audio signal from the microphones 112 of the array 110 represents desirable target signal plus background noise. Accordingly, by subtracting the audio signal from the secondary microphone 130 from the respective audio signals from the microphones 112 of the array 110 can leave desirable target signal.

Accordingly, it can be advantageous to position the array 110 on a selected portion of the UAV housing 201 (shown in FIG. 4) that is opposing and/or distal the portion of the UAV housing 201 upon which to the secondary microphone 130 is positioned. The secondary microphone 130 thereby primarily (and/or only) receives ambient background noise instead of background noise and target signal. For example, referring to FIGS. 5 and 6, a second aerial vehicle 305 is either approaching (as shown in FIG. 5) or moving away from (as shown in FIG. 6) the first aerial vehicle 200. More specifically, the second aerial vehicle 305 is either approaching or moving away from the array 110 positioned on the first side 315 of the housing 205 of the first aerial vehicle 200. Sound 310 from the second aerial vehicle 305 therefore meets the array 110 first and is substantially attenuated and/or blocked before reaching the secondary microphone 130. In other words, the audio signals or sound 310 from the second aerial vehicle 305 can be detected at a substantially greater level compared to the secondary microphone 130. The relative placement of the array 110 and the secondary microphone 130 can enable the subtraction of the noise signal of the secondary microphone 130 from the audio signal of the microphones 112 of the array 110 results in the sound 310 emitted from the second aerial vehicle 305.

In contrast, in some embodiments, the noise signal of the secondary microphone 130 is not removed from audio signals obtained by the array 110. The audio signals obtained by the array 110 thereby can be processed or otherwise handled as described herein without the noise removal, at 410. Stated somewhat differently, in some embodiments, the system 100 can omit the secondary microphone 130. For example, as discussed above, FIG. 7 is a flow diagram illustrating a method 400 of aerial vehicle detection and avoidance in accordance with an alternative embodiment, wherein noise may not be removed from received audio signals.

Figure 9:
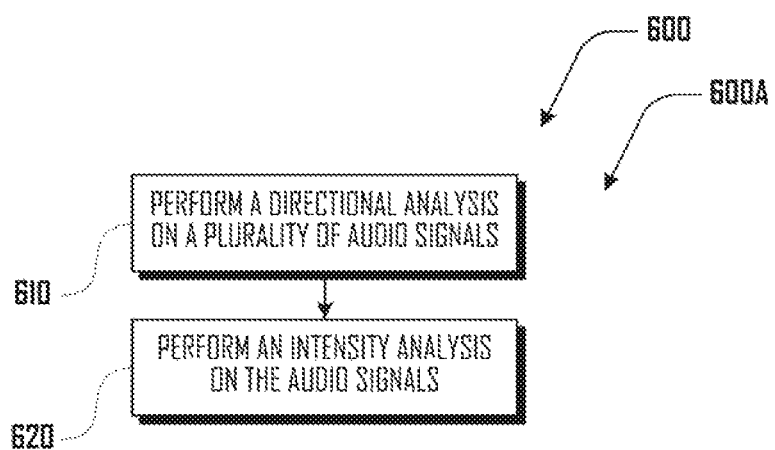
FIG. 9 is an exemplary flow diagram illustrating a method of identifying the position and velocity of a signal source such as an aerial vehicle.

FIG. 9 illustrates an exemplary embodiment 600A of the method 600 of determining the position and velocity of a signal source such as the second aerial vehicle 305. In block 610, a directional analysis is performed on a plurality of audio signals, and, in block. 620, an intensity analysis is performed on the audio signals. The directional analysis, at 610, can be performed in any suitable way, including the methods described in further detail below. The intensity analysis, at 620, can include determining the relative intensity of audio signals. For example, received audio signals can be compared to a baseline intensity, which can be associated with a type of signal source. Intensity analysis can be configured to determine the relative distance of a signal source, such as the second aerial vehicle 305, from the system 100.

In various embodiments, the position and velocity of a signal source can be determined by observing changes of determined position of a signal source including distance and/or direction of the signal source.

Figure 10:
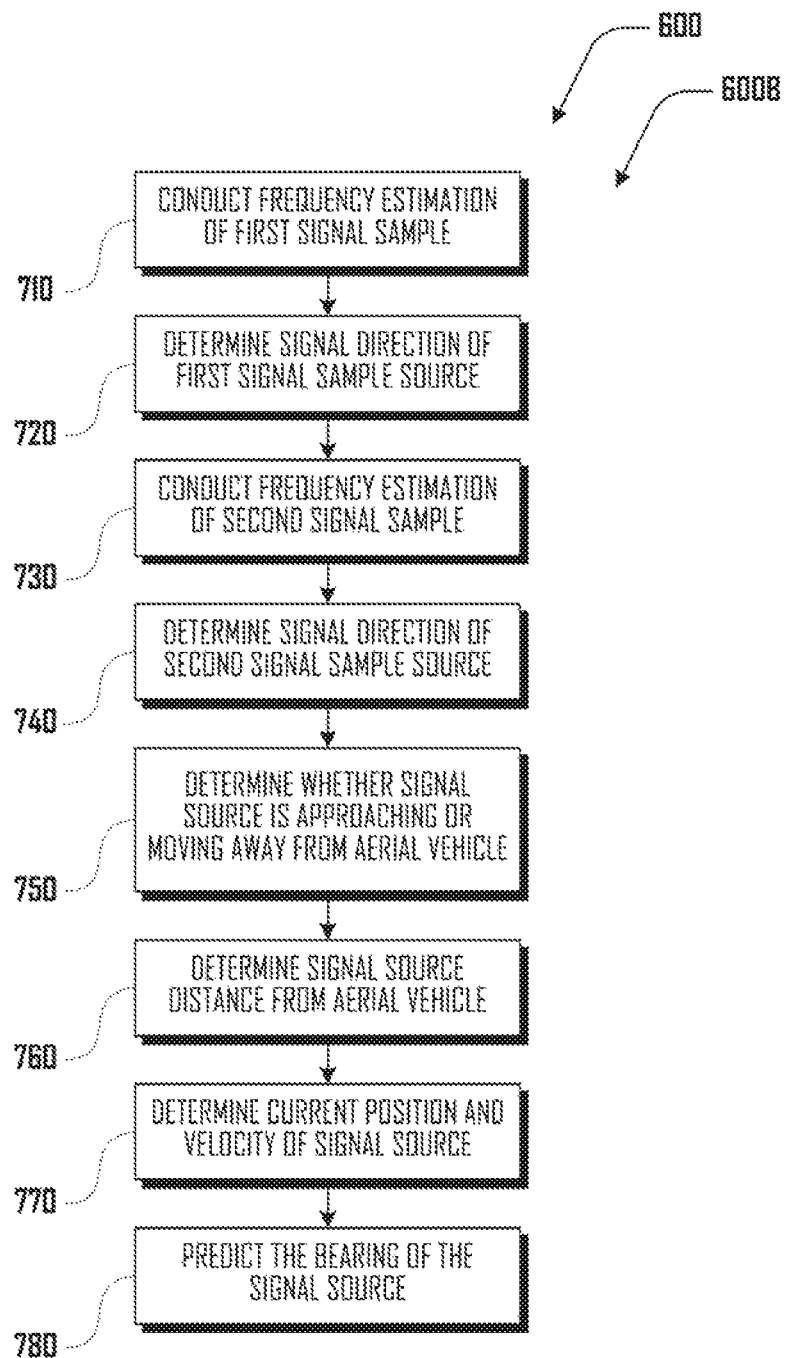
FIG. 10 is an exemplary flow diagram illustrating another method of identifying the position and velocity of a signal source such as an aerial vehicle.

FIG. 10 illustrates an exemplary embodiment 600B of the method 600 of determining the position and velocity of a signal source such as the second aerial vehicle 305. The method 600 begins, in block 710, where a frequency estimation of a first signal sample is conducted.

Figure 14:
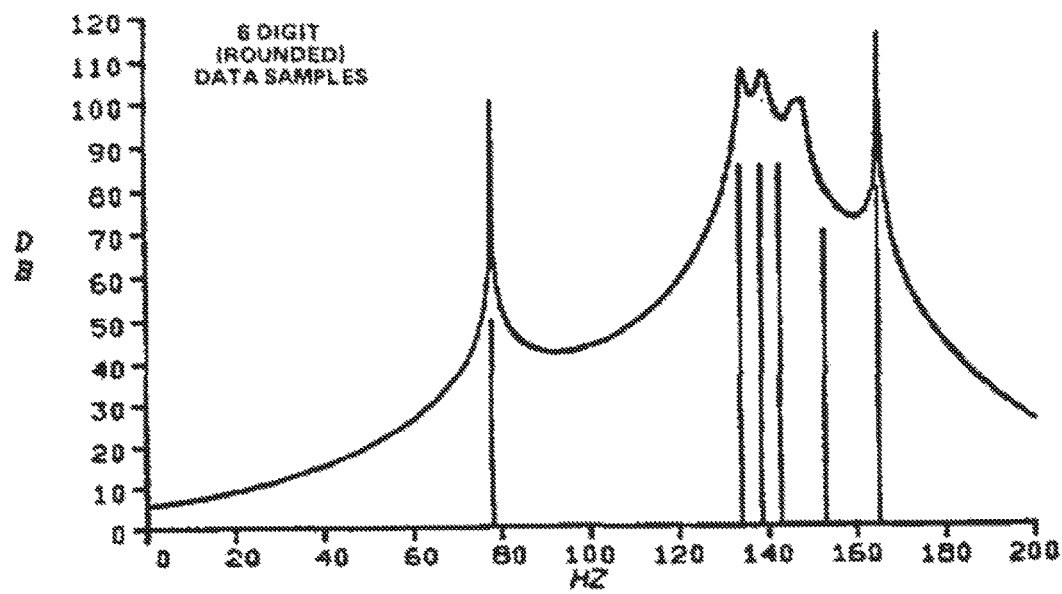
FIG. 14 is an exemplary graph illustrating the relationship between a change of the reciprocal of the inner product based on frequency during implementation of the MUSIC algorithm.

For example, assume that matrix A indicates the attributions of the signal sources, (referred to as $(A=(a_1, a_2, \ldots ,a_N)))$, $a_i$ is a function of frequency (f) and/or incidence angle ($\theta$). Further assume that F represents source signals and W indicates noise. The composite source and noise signal received can be indicated as X=AF+W. Assuming Rx indicates the covariance matrix of X, then the eigenvalues of Rx matrix are $\{\lambda_1, \lambda_2, \ldots, \lambda_N\}$. If signal sources have D signals, then among the eigenvalues, N-D eigenvalues are equal. In other words, $\{\lambda_{D+1}, \lambda_{D+2}, \ldots, \lambda_{D+N}\}$ correspond to the noise space while other D eigenvalues correspond to the signal space. Further assume that $E_N$ indicates eigenvectors corresponding to eigenvalues $\{\lambda_{D+1}, \lambda_{D+2}, \ldots, \lambda_N\}$ in Rx matrix. These eigenvectors indicate noise space. The noise space and signal space can be necessarily orthogonal. Therefore, if the signal space and the noise space are orthogonal, the inner product of the signal space and the noise space will be 0. Additionally, assume that $P(\omega)=1/a^*(\omega)E_N E_N^* a(\omega)$ indicates the reciprocal of the inner product. The relationship between the change of signal power P with angular frequency $\omega$ is illustrated in FIG. 14, in which the frequency corresponding to each peak in the figure indicates the frequency of the respective sound sources.

Figure 15:
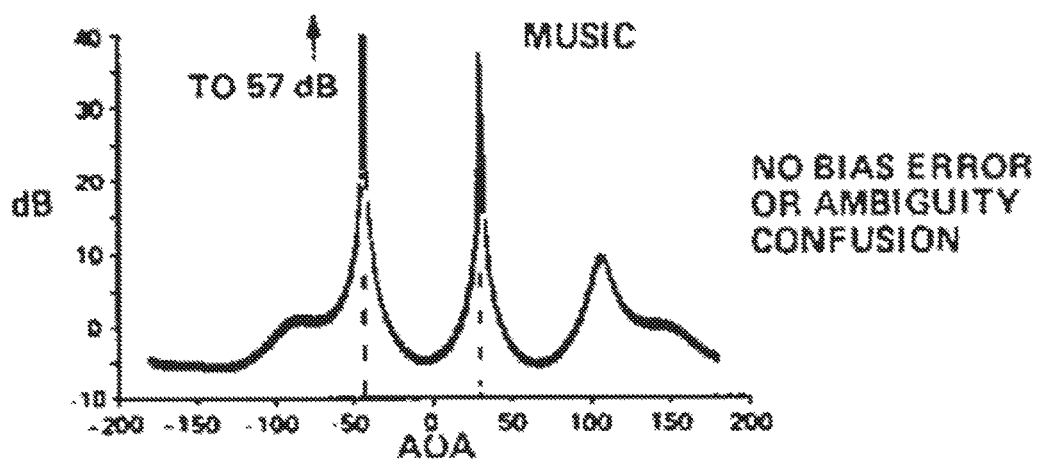
FIG. 15 is an exemplary graph illustrating that the signal space can change with a change of the incidence angle of a signal during implementation of the MUSIC algorithm.

In block 720, a signal direction of the first signal sample source can be determined. For example, in one embodiment, the inner product of the signal space and the noise space can be calculated. In contrast to frequency estimation discussed above, the signal space here can alter with the change of the incidence angle, which is represented by $P(\theta)=1/a^*(\theta)E_N E_N^* a(\theta)$. As shown in FIG. 15, the angle corresponding to each peak indicates the direction of respective sound sources. The intensity of a signal is in proportion to this peak value.

In further embodiments, frequency estimation and signal direction determination can be performed in any suitable way. For example, frequency estimation and signal direction determination can occur as part of implementation of a Multiple Signal Classification algorithm (MUSIC algorithm) (see, e.g., Schmidt, IEEE Transactions On Antennas And Propagation, Vol. AP-34. No. 3, March 1986, which is incorporated herein in its entirety for all purposes).

In block 730, frequency estimation of a second signal sample is conducted, and, in block 740, signal direction of the second signal sample source is determined. In block 750, a determination is made whether the signal source is approaching or moving away from the first aerial vehicle 200. For example, as illustrated in FIG. 5, where the signal source (i.e., the second aerial vehicle 305) is moving toward the first aerial vehicle 200, also referred to as a sensing aerial vehicle 200, the Doppler effect causes the frequency of sound 310A from the second aerial vehicle 305 to be perceived as being higher than when the second aerial vehicle 305 is stationary or moving away from the sensing aerial vehicle 200.

In contrast, as illustrated in FIG. 6, where the signal source (i.e., the second aerial vehicle 305) is moving away from the sensing aerial vehicle 200, the Doppler effect causes the frequency of sound 310B from the second aerial vehicle 305 to be perceived as being lower than when the second aerial vehicle 305 is stationary or moving toward the sensing aerial vehicle 200.

In other words, signal source of the second aerial vehicle 305 moving toward sensing aerial vehicle 200 causes sound waves 310A to be compressed and therefore perceived as having a higher frequency or higher pitch. On the other hand, signal source of the second aerial vehicle 305 moving away from sensing aerial vehicle 200 causes sound waves 310B to be expanded and therefore perceived as having a lower frequency or lower pitch. Accordingly, by comparing the frequency of sequential signal source samples, whether the signal source is approaching or moving away can be determined.

Additionally and/or alternatively, signal intensity can also be used to determinate whether the signal source is approaching or moving away. For example, where signal intensity and the pitch of the signal increase, a determination can be made that the signal source is approaching. Similarly, where signal intensity and the pitch of the signal decrease, a determination can be made that the signal source is moving away.

Therefore, according to the Doppler Effect, it can be determined whether the signal source is approaching or moving away. The intensity of a signal source can assist in such a determination. For example, if the frequency is increasing and the intensity is going up, the signal source can be determined to be approaching. Otherwise, the signal source can be determined to be moving away.

In block 760, the distance of the signal source from the primary microphone array 110 is determined. For example, in some embodiments, such a determination can be made based on the intensity of the signal. In other words, a louder signal can be determined to be closer than a quieter signal. In some embodiments, distance can calculated based on a known or assumed distance and intensity values corresponding to a given signal source. For example, if a determination is made that the signal source is a UAV of "Type A," the operating intensity of this UAV at various distances can be known and the intensity of a received signal can be compared to these known values to estimate a distance value. In other embodiments, distance values can be estimated based on assumed operating intensities of a given signal source. In some embodiments, distances can be in units of distance (e.g., meters) or can be generally descriptive of distance ranges (e.g., very far, far, close, very close, and the like).

In block 770, the current position and velocity of the signal source is determined. For example, such a determination can be based on one or more signal direction determination, distance determination, and/or approaching/moving away determination as discussed herein.

In block 780, the bearing of the signal source optionally can be determined. For example, in addition to calculating the current position of a signal source as described above in reference to block 770, it can also be advantageous to estimate the bearing or future position(s) and/or velocity/ velocities of a signal source. Such a determination can be based on one or more velocity determination, position determination, signal direction determination, distance determination, and/or approaching/moving away determination as discussed herein.

Figure 11:
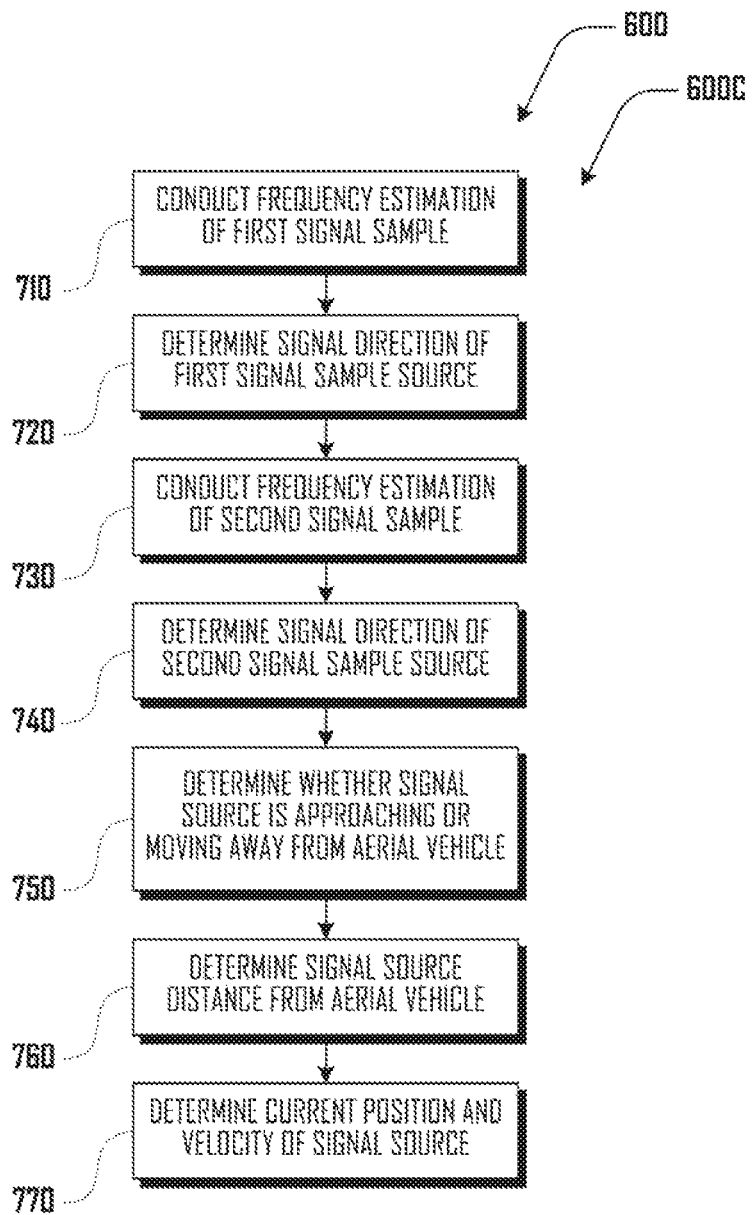
FIG. 11 is an exemplary flow diagram illustrating a further method of identifying the position and velocity of a signal source such as an aerial vehicle.

In various embodiments, the determining the bearing of the signal source, at 780, is absent. For example, FIG. 11 illustrates an exemplary embodiment 600C of the method 600 of determining the position and velocity of a signal source such as the second aerial vehicle 305, wherein the determining the bearing of the signal source is absent.

Additionally, any of the methods described herein can be embodied in a computer product that is encoded on non-transitory machine-readable storage media. For example, a non-transitory machine-readable storage media can comprise a portable memory device such as a flash drive, or a memory associated with a device such as the memory 122 that is part of the sensing device 120 shown in FIGS. 1 and 2. Such a computer product can be executed by any suitable processing device, which can include the processor 121 that is part of the sensing device 120 shown in FIGS. 1 and 2.

Additionally, although various embodiments discussed herein relate to a first aerial vehicle 200 detecting a second aerial vehicle 305 (shown in FIGS. 5 and 6), in some embodiments, ground-vehicles, stations, or devices can also comprise a detection system 100. In further embodiments, ground-vehicles, stations, or devices can be operably connected to one or more first aerial vehicle 200, which can be advantageous for sharing data with the first aerial vehicle 200, including the position of other aerial vehicles 305 that may not be configured to share data.

For example, FIG. 16 is an exemplary network diagram that illustrates a system 1100 including a first aerial vehicle 200 that is operably connected to a base station 1105 via a network 1110. The base station 1105 and the first aerial vehicle 200 can each comprise a respective detection system 100. Accordingly, in various embodiments, one or both of the base station 1105 and first aerial vehicle 200 can detect the position and velocity of various objects, including the second aerial vehicle 305. Detecting of the position and velocity of the second aerial vehicle 305 by both the base station 1105 and first aerial vehicle 200 can be advantageous because such detections can be shared via the network 1110 and used to improve accuracy of a determined position and velocity of the second aerial vehicle 305. Additionally, it may be advantageous for the base station 1105 to detect the position and velocity of the first aerial vehicle 200 so that such a position and velocity can be provided to the first aerial vehicle 200 via the network 1110 so that the first aerial vehicle 200 has data on its own position and velocity.

FIGS. 17-20 depict examples of four alternative embodiments 1210, 1220, 1230, 1240 of an aerial vehicle that includes selected combinations of primary microphone arrays 110 and secondary microphones 130. FIG. 17 is an exemplary alternative embodiment of a detection system 100 positioned on a first aerial vehicle 1210, where the detection system 100 includes a first and second primary microphone arrays 110 and a first and second secondary microphones 130 positioned on opposing sides of the aerial vehicle 1210 and pointing in opposite directions. Such an embodiment may be advantageous for enhanced detection of signal sources approaching from opposing sides of the aerial vehicle 1210.

FIG. 18 is another exemplary alternative embodiment of a detection system 100 positioned on a first aerial vehicle 1220, where the detection system 100 includes a first and second primary microphone arrays 110 and a first and second secondary microphones 130 positioned perpendicularly on the aerial vehicle 1220 and pointing outwardly. Such an embodiment may be advantageous for enhanced detection of signal sources approaching from different sides of the aerial vehicle 1220.

Accordingly, as illustrated in FIGS. 17 and 18, in some embodiments the detection system 100 can include a first primary microphone array pointed in a first direction; a first secondary microphone pointed in a second direction; a second primary microphone array pointed in a third direction; and a second secondary microphone pointed in a fourth direction. In various embodiments, at least two of the first, second, third and fourth directions can be different directions.

Figure 19:
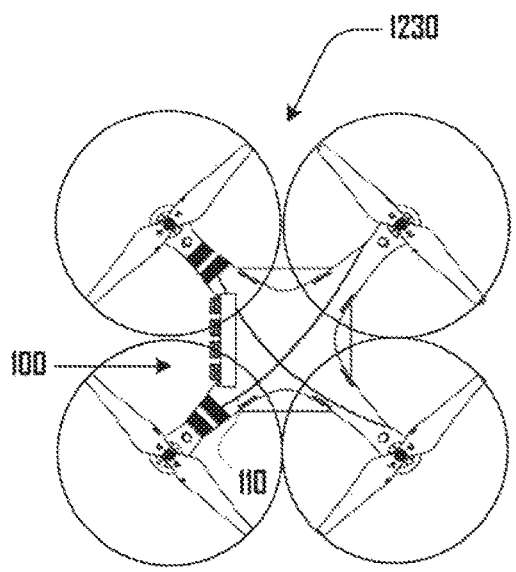
FIG. 19 is a detail drawing illustrating another alternative embodiment of the detection system of FIG. 1, where the detection system includes a single microphone array.

FIG. 19 is a further exemplary alternative embodiment of a detection system 100 positioned on an aerial vehicle 1230, where the detection system 100 includes a single primary microphone array 110. Such an embodiment may be advantageous where noise reduction via a secondary microphone 130 is not necessary.

Figure 20:
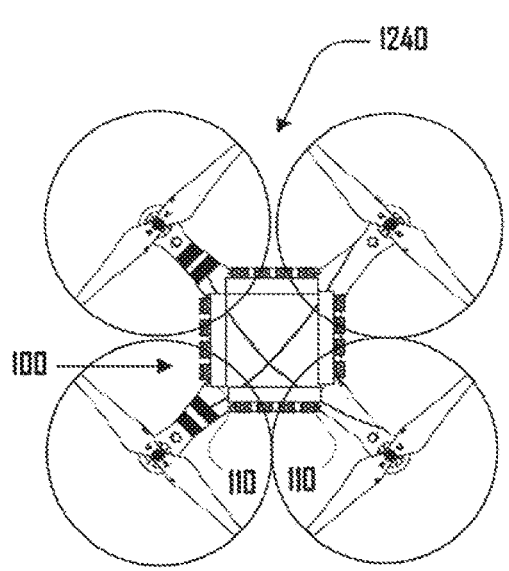
FIG. 20 is a detail drawing illustrating still further alternative embodiment of a detection system of FIG. 19, where the detection system includes four separate microphone arrays positioned on an aerial vehicle.

FIG. 20 is a still further exemplary alternative embodiment of a detection system 100 positioned on a first aerial vehicle 1240, where the detection system 100 includes four separate primary microphone arrays 110 positioned on the aerial vehicle 1240. Such an embodiment may be advantageous for enhanced detection of signal sources approaching from various sides of the aerial vehicle 1240, where noise reduction via a secondary microphone 130 is not necessary.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of determining a position and a velocity of a signal source, comprising:
obtaining a plurality of audio signals from a primary microphone array arranged at a first location of a moving platform;
obtaining a noise audio signal from a secondary microphone arranged at a second location of the moving platform, the first location and the second location being at opposing sides of the moving platform;
generating a plurality of processed audio signals by subtracting the noise audio signal from each of the plurality of audio signals;
identifying, from the plurality of processed audio signals, a set of processed audio signals that match an audio signature of the signal source according to characteristics associated with the audio signature, the characteristics associated with the audio signature including a number of signature peaks in the audio signature, intensities of the signature peaks in the audio signature, and shift distances of detected peaks in the set of processed audio signals respectively from corresponding ones of the signature peaks in the audio signature;
performing a direction analysis on the set of processed audio signals;
performing a frequency analysis on the set of processed audio signals;
estimating the position and the velocity of the signal source according to a result of the direction analysis and a result of the frequency analysis; and
determining whether the signal source is on a collision course with the moving platform according to the position and the velocity of the signal source.

2. The method of claim 1, further comprising:
conducting a frequency estimation on the set of processed audio signals; and
determining a signal direction of the signal source based on the set of processed audio signals.

3. The method of claim 2,
wherein the set of processed audio signals are a first set of processed audio signals, the method further comprising:
identifying, from the plurality of processed audio signals, a second set of processed audio signals that match the audio signature of the signal source according to the characteristics associated with the audio signature; and
conducting a frequency estimation on the second set of processed audio signals.

4. The method of claim 3,
wherein the signal direction is a first signal direction, the method further comprising:
determining a second signal direction of the signal source based on the second set of processed audio signals.

5. The method of claim 4, further comprising:
determining whether the signal source is approaching or moving away from a detection position by performing a Doppler analysis of the first and second sets of processed audio signals.

6. A method of determining a position and a velocity of a signal source, comprising:
obtaining a plurality of audio signals from a primary microphone array arranged at a first location of a moving platform;
obtaining a noise audio signal from a secondary microphone arranged at a second location of the moving platform, the first location and the second location being at opposing sides of the moving platform;
generating a plurality of processed audio signals by subtracting the noise audio signal from each of the plurality of audio signals;
identifying, from the plurality of processed audio signals, a first set of processed audio signals and a second set of processed audio signals that match an audio signature of the signal source according to characteristics associated with the audio signature, the characteristics associated with the audio signature including a number of signature peaks in the audio signature, intensities of the signature peaks in the audio signature, and shift distances of detected peaks in the set of processed audio signals respectively from corresponding ones of the signature peaks in the audio signature; conducting a frequency estimation on the first set of audio signals; determining a first signal direction of the signal source based on the first set of audio signals; conducting a frequency estimation on the second set of audio signals; determining a second signal direction of the signal source based on the second set of audio signals; determining whether the signal source is approaching or moving away from a detection position by performing a Doppler analysis of the first and second sets of audio signals; determining the position and the velocity of the signal source based on the Doppler analysis, a direction analysis, and an intensity analysis; and
determining whether the signal source is on a collision course with the moving platform according to the position and the velocity of the signal source.

7. An acoustic sensing system, comprising:
a housing of a moving platform;
a primary microphone array positioned at a first location of the housing and comprising a plurality of microphones;
a secondary microphone positioned at a second location of the housing and being operably connected to the primary microphone array, the first location and the second location being at opposing sides of the housing; and
a processing device configured to:
obtain a plurality of audio signals from the primary microphone array;
obtain a noise audio signals from the secondary microphone;
generate a plurality of processed audio signals by subtracting the noise audio signal from each of the plurality of the audio signals;
identify, from the plurality of processed audio signals, a set of processed audio signals that match an audio signature of the signal source according to characteristics associated with the audio signature, the characteristics associated with the audio signature including a number of signature peaks in the audio signature, intensities of the signature peaks in the audio signature, and shift distances of detected peaks in the set of processed audio signals respectively from corresponding ones of the signature peaks in the audio signature;
determine a position and a velocity of the signal source based on a direction analysis and an intensity analysis of the set of processed audio signals associated with the signal source, and
determine whether the signal source is on a collision course with the moving platform according to the position and the velocity of the signal source.

8. The acoustic sensing system of claim 7, wherein the primary microphone array points in a first direction and the secondary microphone points in a second direction that is different from the first direction.

9. The acoustic sensing system of claim 8, wherein the first direction is opposite to the second direction.

10. The acoustic sensing system of claim 8, wherein the first direction is substantially perpendicular to the second direction.

11. The acoustic sensing system of claim 7, wherein microphones of the primary microphone array are positioned on a substrate in a matrix configuration having rows and columns.

12. The acoustic sensing system of any claim 7, wherein the processing device is further configured to:
conduct a frequency estimation on the set of processed audio signals; and
determine a signal direction of the signal source based on the set of processed audio signals.

13. The acoustic sensing system of claim 7, wherein the processing device is further configured to predict a future position and a future velocity of the based on a Doppler analysis, the direction analysis and the intensity analysis of the set of processed audio signals.

14. The method of claim 1, wherein the audio signature includes a pattern of one or more frequency peaks.

15. The method of claim 1, further comprising:
comparing one or more intensities of the set of processed audio signals with one or more baseline intensities associated with a type of the signal source to determine a relative distance between the signal source and the moving platform; and
estimating the position and the velocity of the signal source based on the relative distance.

16. The method of claim 1, further comprising:
comparing one or more intensities of the set of processed audio signals with one or more baseline intensity associated with a type of the signal source at one or more known distance values to the signal source to determine a relative distance value between the signal source and the moving platform; and
estimating the position and the velocity of the signal source based on the relative distance value.

17. The method of claim 1, further comprising determining a type of the signal source.

18. The method of claim 1, wherein types of microphones of the primary microphone array are different from a type of the secondary microphone.

19. The method of claim 1, wherein:
a frequency range of the plurality of audio signals obtained by the primary microphone array include one or more of subsonic frequency, sonic frequency, and ultrasonic; and
a frequency range of the noise audio signal obtained by the secondary microphone includes one or more of subsonic frequency, sonic frequency, and ultrasonic.

20. The method of claim 1, wherein the audio signature uniquely identifies the signal source.

* * * * *